US 9,090,484 B2

(12) United States Patent
Izawa

(10) Patent No.: US 9,090,484 B2
(45) Date of Patent: Jul. 28, 2015

(54) TREATMENT DEVICE AND TREATMENT BAG

(75) Inventor: Yoshinobu Izawa, Tokyo (JP)

(73) Assignees: Yoshinobu Izawa, Tokyo (JP); Akehiko Yamazaki, Tokyo (JP)

( * ) Notice: Subject to any disclaimer, the term of this patent is extended or adjusted under 35 U.S.C. 154(b) by 1026 days.

(21) Appl. No.: 13/056,663

(22) PCT Filed: Jul. 29, 2009

(86) PCT No.: PCT/JP2009/063478
§ 371 (c)(1),
(2), (4) Date: Apr. 22, 2011

(87) PCT Pub. No.: WO2010/013742
PCT Pub. Date: Feb. 4, 2010

(65) Prior Publication Data
US 2011/0203983 A1    Aug. 25, 2011

(30) Foreign Application Priority Data

Jul. 29, 2008  (JP) ................. 2008-195528

(51) Int. Cl.
| | |
|---|---|
| C02F 1/00 | (2006.01) |
| B01D 21/01 | (2006.01) |
| B01D 21/02 | (2006.01) |
| B01D 21/08 | (2006.01) |
| B01D 21/30 | (2006.01) |
| C02F 1/52 | (2006.01) |
| B01D 21/00 | (2006.01) |

(52) U.S. Cl.
CPC ............ C02F 1/004 (2013.01); B01D 21/0003 (2013.01); B01D 21/01 (2013.01); B01D 21/02 (2013.01); B01D 21/08 (2013.01); C02F 1/52 (2013.01); B01D 21/30 (2013.01); C02F 2209/11 (2013.01); C02F 2209/42 (2013.01)

(58) Field of Classification Search
CPC .......... C02F 1/004; C02F 1/52; C02F 1/5281; C02F 2209/11; C02F 2209/42; B02D 21/0003; B02D 21/003; B02D 21/01; B02D 21/02; B02D 21/08; B02D 21/30
See application file for complete search history.

(56) References Cited

U.S. PATENT DOCUMENTS

| | | | | |
|---|---|---|---|---|
| 5,948,258 | A * | 9/1999 | Daugherty | 210/513 |
| 2002/0020674 | A1 * | 2/2002 | Izawa | 210/723 |

FOREIGN PATENT DOCUMENTS

| | | |
|---|---|---|
| JP | 2625590 B2 | 4/1997 |
| JP | 3492300 B2 | 11/2003 |

* cited by examiner

*Primary Examiner* — Lucas Stelling
(74) *Attorney, Agent, or Firm* — K. David Crockett, Esq.; Niky Economy Syrengelas, Esq.; Crockett & Crockett, PC

(57) ABSTRACT

The present invention provides a treatment device that can greatly decrease not only an installation area but also a power cost and can further improve durability of a movable member and a treatment bag used for this treatment device. The present invention is characterized in that the inside of a water tank is partitioned into an interior space of a treatment bag main body and an exterior space in which filling water is stored by immersing a treatment bag in the water tank storing the filling water whose water level is constantly maintained, the treatment bag comprising: the treatment bag main body hermetically formed of an impermeable flexible sheet; a supply port through which a treatment target liquid is supplied into the treatment bag main body; and a discharge port through which a treated liquid is discharged to the outside.

3 Claims, 11 Drawing Sheets

TREATMENT DEVICE AND TREATMENT BAG

TECHNICAL FIELD

The present invention relates to a treatment device and a treatment bag that reduces power and enables a stable treatment.

BACKGROUND ART

To carry out various kinds of treatments such as a water treatment, large-scale treatment facilities and relevant facilities must be set up and a large facility site is required in conventional examples.

The present inventor has suggested a revolutionary technology that can greatly reduce an installation area in regard to a water treatment device (Patent Document 1).

Patent Document 1 discloses a technology that a water tank is partitioned into upper and lower two chambers, water level regulating water is supplied/discharged to the lower chamber, a partition wall is moved up and down, and treatment target water is taken into or out from the upper chamber to be treated.

Although this technology is a breakthrough technology, it has problems that remain to be solved in that power is required for supplying/discharging the water level regulating water and that durability of a movable member, e.g., the partition wall should be further improved.

It is to be noted that Patent Document 2 discloses an impermeable flexible treatment bag but does not disclose how the treatment bag is used.

Patent Document 1: Japanese Patent Publication No. 3492300

Patent Document 2: Japanese Patent Publication No. 2625590

DISCLOSURE OF INVENTION

Problem to be Solved by the Invention

It is an object of the present invention to provide a treatment device that can greatly reduce not only an installation area but also a power cost and can further improve the durability of a movable member and a treatment bag used for this treatment device.

Further, it is another object of the present invention to provide a treatment device that can be applied to various kinds of treatments such as a water treatment, a reaction, mixing, warming, or heat retention and a treatment bag used for this treatment device.

Other objects of the present invention will be brought out by the following description.

Means for Solving the Problem

The objects are solved by each of the following aspects of the invention.

The invention provides a treatment device, wherein the inside of a water tank is partitioned into an interior space of a treatment bag main body and an exterior space in which filling water is stored by immersing a treatment bag in the water tank storing the filling water whose water level is constantly maintained, the treatment bag comprising: the treatment bag main body hermetically formed of an impermeable flexible sheet; a supply port through which a treatment target liquid is supplied into the treatment bag main body; and a discharge port through which a treated liquid is discharged to the outside.

The invention also provides a treatment device characterized by comprising filling water supplying means for supplying into the water tank the filling water whose amount corresponds to a reduced liquid amount when the treated liquid in the treatment bag main body is discharged from the discharge port.

The invention also provides a treatment device characterized in that the water tank has an overflow port through which the filling water whose amount corresponds to an increased liquid amount when the treatment target liquid is supplied into the treatment bag main body from the supply port is discharged.

The invention also provides a treatment device characterized in that a treated liquid discharge line through which the treated liquid in the treatment bag main body is discharged is connected to the discharge port of the treatment bag.

The invention also provides a treatment device characterized in that the treated liquid in the treatment bag main body is discharged through the treated water discharge line by driving of a discharge pump or a siphon effect.

The invention also provides a treatment device characterized in that the treated water discharge line is connected to the exterior space of the water tank.

The invention also provides a treatment bag comprising: a treatment bag main body hermetically formed of an impermeable flexible sheet; and a supply port through which a liquid is supplied into the treatment bag main body and a discharge port through which the liquid is discharged to the outside, wherein the treatment bag is used being immersed in filling water whose water level is constantly maintained.

The invention also provides a treatment bag characterized by comprising an agitator that is suspended toward the inside from a nonflexible supply portion provided at an upper portion of the treatment bag main body.

The invention also provides a treatment bag characterized in that an end of the nonflexible supply portion is placed on an outer side beyond a maximum outside diameter of agitating blades of the agitator.

The invention also provides a treatment bag characterized by comprising detecting means for detecting a fully filled state of the inside of the treatment bag main body.

Effect of the Invention

According to the present invention, it is possible to provide a treatment device that can greatly reduce not only an installation area but also a power cost and can further improve the durability of a movable member and a treatment bag used for this treatment device.

Furthermore, according to the present invention, it is possible to provide a treatment device that can be applied to various kinds of treatments such as a water treatment, a reaction, mixing, warming, or heat retention and a treatment bag used for this treatment device.

EXPLANATIONS OF LETTERS OR NUMERALS

Figure 1:
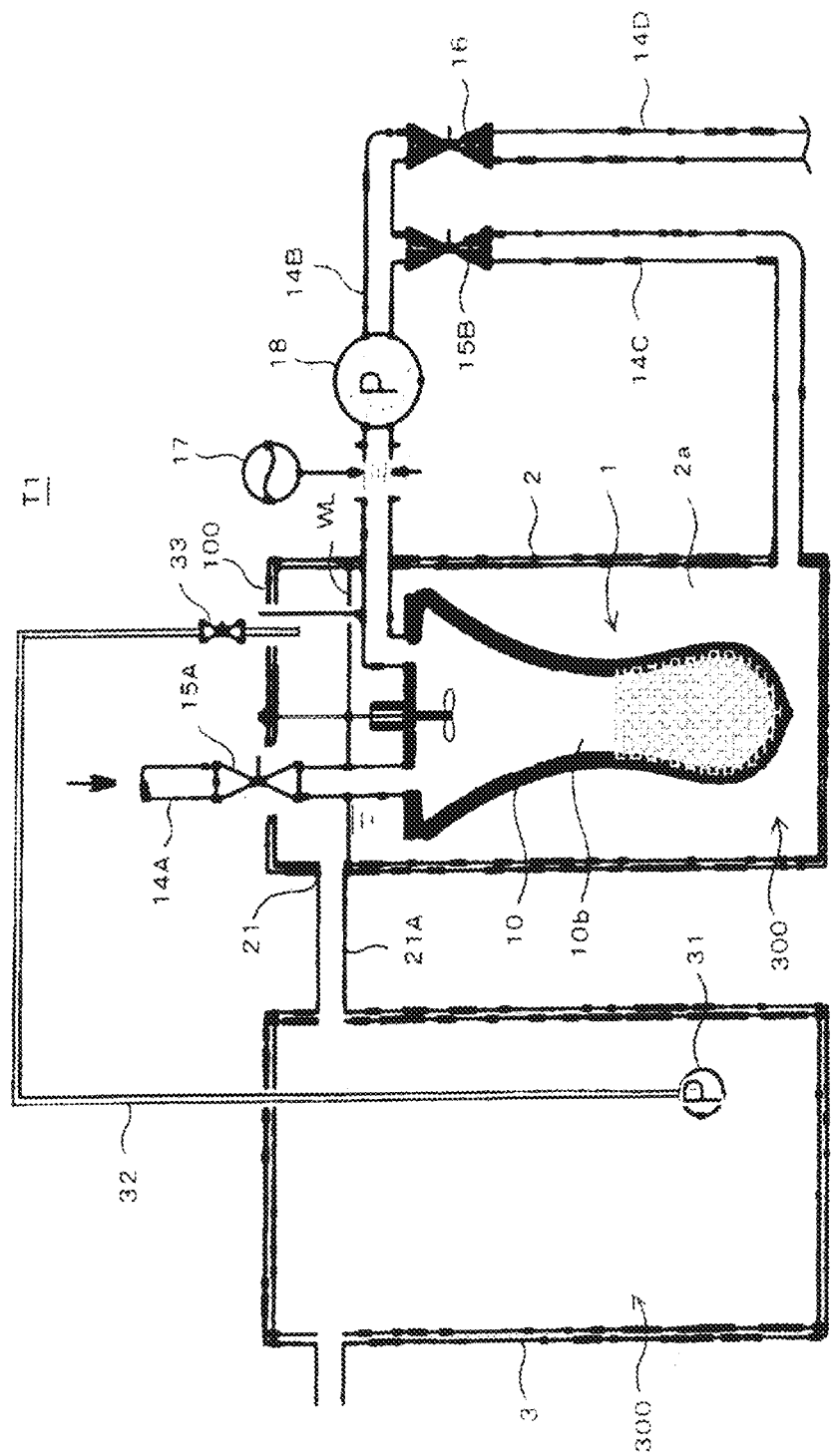
FIG. 1 is a schematic block diagram showing a first embodiment of a water treatment device.

1: treatment bag
10: treatment bag main body
10b: interior space
12A: supply port
12B: discharge port
2, 2A to 2C: water tank
2a: exterior space
3: filling water storage tank
200: raw water
202: treated water
300: filling water
T1 to T5: water treatment device
WL: water level of the filling water Best Mode(s) for Carrying out the Invention Embodiments according the present invention will now be described hereinafter with reference to the drawings.

FIG. 1 shows a first embodiment of a water treatment device.

A water treatment device T1 is constituted of a treatment bag 1, a water tank 2 that accommodates this treatment bag 1 therein, and a filling water storage tank 3 from which filling water 300 is supplied into the water tank 2.

The treatment bag 1 is suspended in the water tank 2 having the filling water 300 stored therein and immersed in the filling water 300 so that an entire treatment bag main body 10 is lower than a water level WL. Therefore, the inside of the water tank 2 is partitioned into an interior space 10b of the treatment bag main body 10 and an exterior space 2a in which the filling water 300 is stored.

An example of the treatment bag 1 will now be described with reference to FIG. 2.

The treatment bag 1 is a bag-like container as a movable member that inflates/deflates to carry out a treatment for various kinds of liquids in the treatment bag main body 10. Here, the treatment in the present invention means conducting at least one of mixing, agitation, aggregation, a reaction, heating, cooling, and heat retention.

The treatment bag 1 according to this embodiment has a supply portion 11, a supply port 12A for a liquid, a discharge port 12B for a liquid, and an agitator 13 in the treatment bag main body 10. That is, as the treatment bag 1 according to this embodiment, there is exemplified a treatment bag equipped with an agitator that can be preferably used for a water treatment for performing aggregation, agitation, and precipitation separation of raw water inside by using an aggregating agent to take out clean treated water. In this treatment bag 1, a supply tube 14A and a discharge tube 14B are connected to the supply port 12A and the discharge port 12B, respectively, and these ports can be opened/closed by opening/closing valves 15A and 15B that are controlled to be opened/closed by non-illustrated controlling means.

The treatment bag main body 10 is formed into a bag shape, e.g., a bottomed cylindrical shape having an opening 10a at an upper portion thereof by using an impermeable flexible sheet. As the impermeable flexible sheet, it is possible to use, e.g., a single layer sheet using any one of a soft synthetic resin sheet consisting of chloroethene, polyethylene, an ethylene-vinyl acetate copolymer, or urethane, a rubber sheet, and others, or a laminated sheet obtained by laminating at least two selected from these sheets, or a composite sheet obtained by laminating a synthetic resin sheet, a rubber sheet, and a woven cloth.

The supply portion 11 is not flexible, and it is preferably formed of a plate material having rigidity such as a stainless plate or an FRP plate. This supply portion 11 is disposed to close the opening 10a at the upper portion of the treatment bag main body 10 in a water-tight manner. The inside of the treatment bag main body 10 except the supply port 12A and the discharge port 12B is hermetically closed by this supply portion 11.

The agitator 13 is of a configuration that a motor 13a is installed on an upper surface of the supply portion 11 and agitating blades 13b that rotate by the motor 13a are suspended in the treatment bag main body 10 through the supply portion 11.

The supply portion 11 according to this embodiment has a size that enables opening the supply port 12A and the discharge port 12B for a liquid. However, no problem occurs as long as the supply portion 11 has a size that enables supporting the agitator 13 above the treatment bag main body 10. Therefore, the supply port 12A and the discharge port 12B may be directly opened in the treatment bag main body 10.

When the agitator 13 is provided, as a preferred mode of the supply portion 11, an end (an outer peripheral end) of the supply portion 11 is placed on an outer side beyond a maximum outside diameter of the agitating blades 13b of the agitator 13.

As a result, since the upper portion of the treatment bag main body 10 is supported by the supply portion 11 without being bent in a region larger than the maximum outside diameter of the agitating blades 13b, the treatment bag main body 10 is not damaged even if the agitating blades 13b are rotated.

A shape of the supply portion 11 in a planar view is not restricted in particular, and a circular shape, a square shape, or a polygonal shape such as a hexagonal shape can be adopted. Further, this shape is not restricted to a tabular shape, and an upwardly protruding bent shape or an umbrella-like shape can be adopted.

It is preferable for the treatment bag 1 to have detecting means for detecting that the treatment bag main body 10 is fully filled with water.

As the detecting means, a pressure sensor configured to detect a pressure in the treatment bag main body 10 can be used. When a liquid is supplied into the treatment bag main body 10, the treatment bag main body 10 gradually inflates, and an inner pressure increases. The pressure sensor detects a pressure in this treatment bag main body 10, supplies a detection result to the controlling means, and closes the opening/closing valve 15A when the controlling means has detected that a preset pressure was reached, thereby avoiding blowout or damage of the treatment bag main body 10.

Furthermore, as the detecting means, detecting means that directly detects how the treatment bag main body 10 itself has inflated may be adopted. As such detecting means, for example, a detection sensor such as a tension sensor is utilized to detect how a cord or a belt is pulled when the cord or the belt is vertically wound around the treatment bag main body 10 and the treatment bag main body 10 inflates and vertically expands upon supply of a liquid to the inside thereof, thereby detecting a fully filled state in the treatment bag main body 10.

In this case, like the above description, when the opening/closing valve 15A is closed by the controlling means based on a detection value from the detection sensor, blowout or damage of the treatment bag main body 10 can be avoided.

The cord or the belt wound on the outer periphery of the treatment bag main body 10 may be laterally wound around the treatment bag main body 10 to detect how a middle portion of the treatment bag main body 10 inflates in the lateral direction.

Moreover, to avoid excessive inflation of the treatment bag main body 10, it is also preferable to stretch and fix a plurality of inflation preventing tapes or ropes on opposed vertical and lateral inner wall surfaces of the treatment bag main body 10 in order to maintain a shape of the inflated treatment bag main body 10 filled with water.

In FIG. 1, the water tank 2 is formed of, e.g., stainless or FRP into a box shape or a tank shape having a larger inner capacity than that of the treatment bag main body 10. An upper surface of the water tank 2 is opened except a column support 100 configured to suspend the treatment bag 1. An overflow port 21 is opened in an upper side surface of the water tank 2 in association with a position of the water level WL of the filling water 300.

In the water treatment device T1, since the treatment bag 1 is immersed in the filling water 300 in such a water tank 2, even the treatment bag 1 that hardly stands on its own because of its flexibility can be installed, a frame body or a housing for standing the treatment bag 1 on its own is no longer required, and an installation space is not occupied, thereby exploiting an advantage that a facility cost can be greatly reduced by using the inexpensive treatment bag 1 having the simple structure.

The filling water storage tank 3 is placed in parallel to the water tank 2. The inside of the filling water storage tank 3 is connected to the overflow port 21 of the water tank 2 through an overflow tube 21A.

The discharge tube 14B of the treatment bag 1 protrudes to the outside from a side surface of the water tank 2 lower than the water level WL of the filling water 300. An end of this discharge tube 14B is connected with a treated water inlet tube 14C coupled with the lower side surface of the water tank 2. Therefore, the interior space 10b of the treatment bag main body 10 communicates with the exterior space 2a in the water tank 2 through the discharge tube 14B and the treated water inlet tube 14C.

It is to be noted that, in FIG. 1, reference character 14D denotes a sludge discharge tube branching from an end of the discharge tube 14B; 16A, an opening/closing valve that opens/closes a flow path of the treated water inlet tube 14C; 16B, an opening/closing valve that opens/closes a flow path of the sludge discharge tube 14D; 17, a turbidity sensor that measures turbidity of a liquid flowing through the discharge tube 14B; and 18, a discharge pump. The opening/closing valves 16A and 16B and the discharge pump 18 are all controlled by non-illustrated controlling means. Further, a detection value from the turbidity sensor 17 is supplied to the controlling means to control the opening/closing valves 15B and 16.

A supply pump 31 is provided in the filling water storage tank 3. The supply pump 31 supplies the filling water in the tank 3 to the exterior space 2a of the water tank 2 through a filling water supply tube 32. The filling water supply tube 32 has an opening/closing valve 33. Driving of this supply pump 31 is controlled by the non-illustrated controlling means.

A method for treating raw water by using this water treatment device T1 will now be described with reference to FIG. 3 to FIG. 6.

First, the opening/closing valve 15A of the treatment bag 1 is opened whilst the opening/closing valve 15B is closed, and the raw water 200 is supplied into the treatment bag main body 10 through the supply tube 14A to filly fill the treatment bag main body 10 with the raw water. The water tank 2 is fully filled with the filling water 300. Since the treatment bag 1 is immersed in the filling water 300, a balance is not disrupted even though the treatment bag main body 10 is fully filled with the raw water.

When pouring the raw water into the treatment bag main body 10, the detecting means for detecting the filled state in the treatment bag main body 10 detects the fully filled state of the treatment bag main body 10 and the controlling means controls the opening/closing valve 15A to be closed to avoid blowout of the treatment bag main body 10. Furthermore, a detection sensor that comes into contact with the treatment bag main body 10 for detection when the treatment bag main body 10 inflates to enter the filled state may be provided on, e.g., an inner surface of the water tank 2, and the controlling means may control the opening/closing valve 15A to be closed based on a detection signal from this detection sensor.

Figure 3:
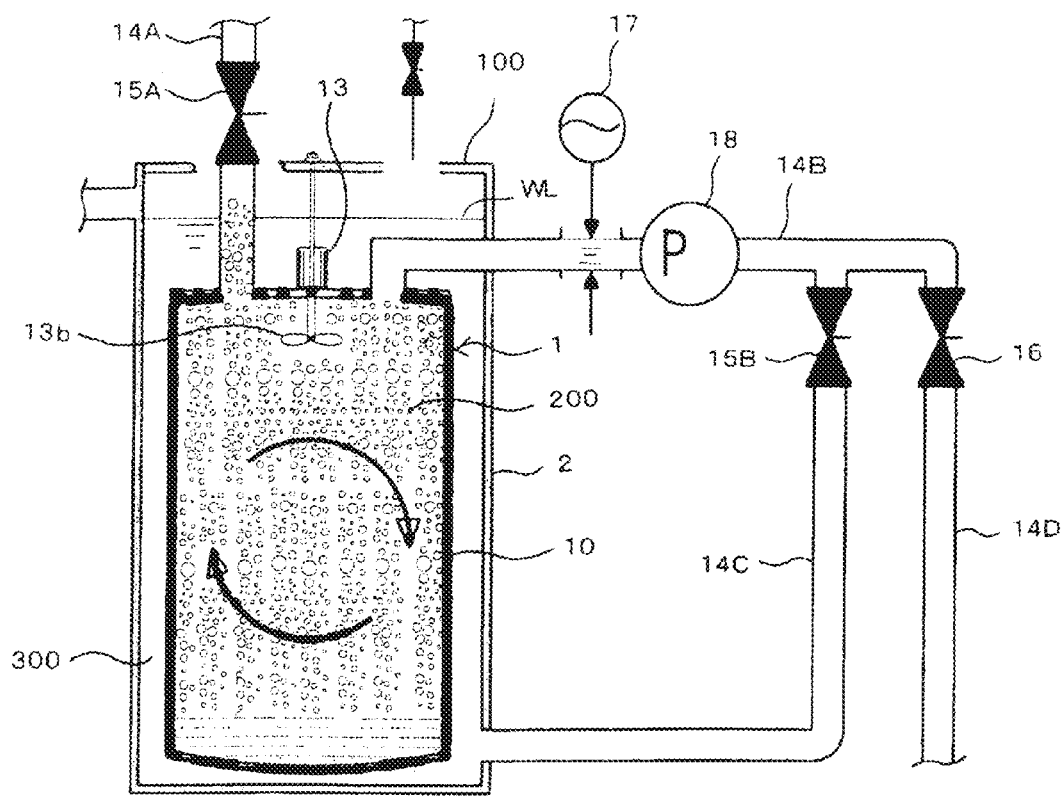
FIG. 3 is a view for explaining a treatment method for raw water carried out by the water treatment device according to the first embodiment.

After the treatment bag main body 10 is filled with the raw water, an aggregating agent is mixed with the raw water, and the aggregating agent is treated by driving the agitator 13 to rotate the agitating blades 13b so that an aggregation and agitation treatment is carried out for a predetermined time (FIG. 3). The aggregating agent may be mixed through the supply tube 14A, or an opening with a lid for inputting the aggregating agent may be provided in the supply portion 11 in advance and the lid may be opened to input the aggregating agent only when inputting the aggregating agent.

Figure 4:
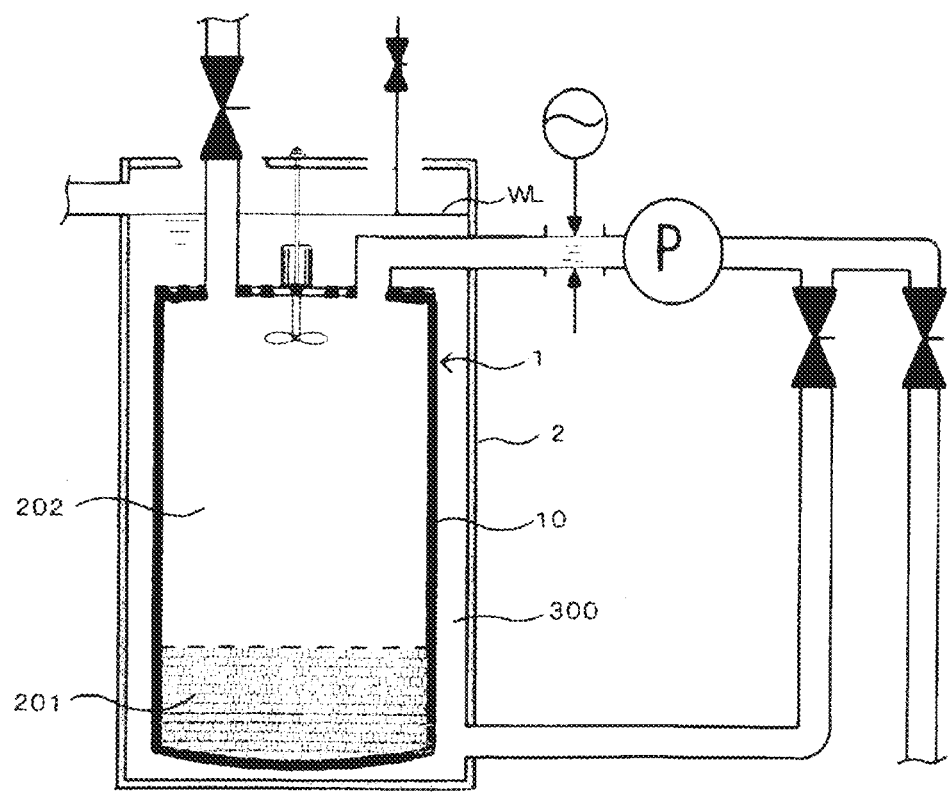
FIG. 4 is a view for explaining the treatment method for raw water carried out by the water treatment device according to the first embodiment.

After the agitation treatment, the agitator 13 is stopped and allowed to enter a stationary mode, and sludge 201 in the treatment bag main body 10 is deposited to be separated from supernatant treated water 202 (FIG. 4).

Figure 5:
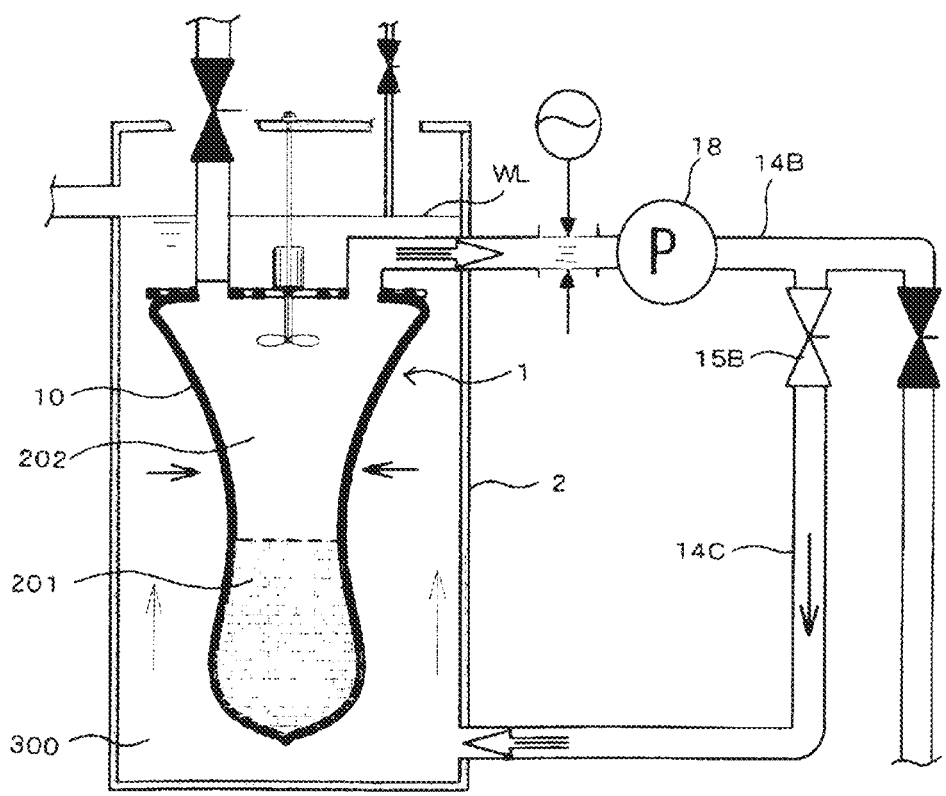
FIG. 5 is a view for explaining the treatment method for raw water carried out by the water treatment device according to the first embodiment.

After the deposition and the separation, the opening/closing valves 15B and 16A are opened, and the discharge pump 18 is driven to discharge the clear supernatant treated water 202 in the treatment bag main body 10 to the outside through the discharge tube 14B. As a result, the treatment bag main body 10 gradually deflates and shrivels (FIG. 5).

The treated water 202 flows into the exterior space 2a in the water tank 2 from the discharge tube 14B through the treated water inlet tube 14C to be provided as the filling water 300. That is, although the water in the water tank 2 is reduced since the treated water 202 in the treatment bag main body 10 is discharged, the discharged treated water 202 is returned into the water tank 2 as it is, namely, it is just moved into the exterior space 2a in the water tank 2, whereby the water level of the filling water 300 in the water tank 2 is always maintained constant and a self-weight balance of the water tank 2 itself is not changed.

Additionally, since moving the treated water into the exterior space 2a in the water tank 2 from the discharge tube 14B below the water level WL of the filling water 300 can suffice, the discharge pump 18 does not require large power at all, and very low power is enough, thereby greatly reducing a power cost.

Figure 6:
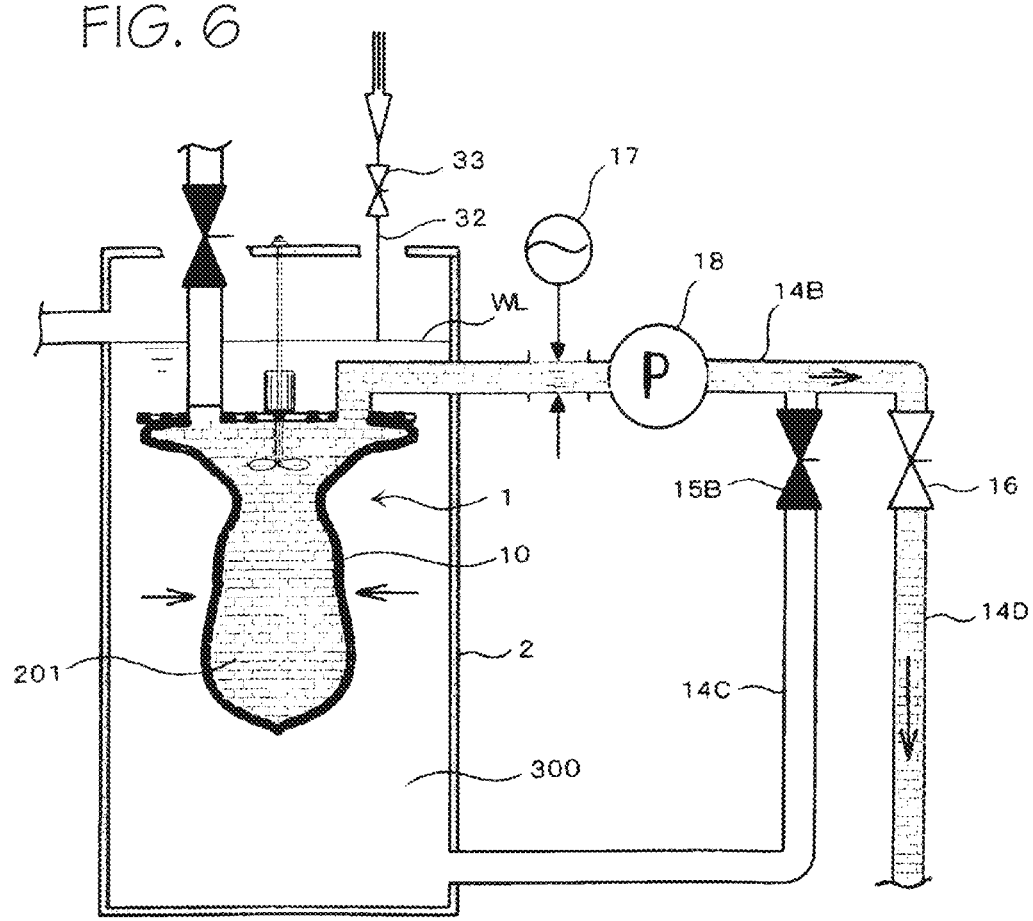
FIG. 6 is a view for explaining the treatment method for raw water carried out by the water treatment device according to the first embodiment.

At the time of discharging the treated water 202, the turbidity sensor 17 monitors turbidity of the liquid flowing through the discharge tube 14B. When discharge of the treated water 202 in the treatment bag main body 10 is about to finish, since the sludge 201 is mixed to change the turbidity, the controlling means closes the opening/closing valve 16A and opens the opening/closing valve 16B to discharge the unnecessary sludge to the outside from the sludge discharge tube 14D (FIG. 6). Therefore, the exterior space 2a in the water tank 2 can store the clear treated water 202 alone. The treated water 202 that has flowed into the exterior space 2a turns to the filling water 300 in the water tank 2. Further, since the sludge discharge tube 14D is branched from the discharge tube 14B, the sludge can be discharged from the discharge port 12B, and hence a sludge discharge port does not have to be additionally provided in the treatment bag main body 10.

At this time, to fill a shortfall of the filling water 300 corresponding to a discharged amount of the sludge 201, the filling water 300 is supplied into the water tank 2 from the filling water storage tank 3 through the filling water supply tube 32. As a result, the water level in the water tank 2 is maintained constant.

To treat the next raw water, when the opening/closing valve 15A is again opened to supply the raw water 200 into the treatment bag main body 10, the deflated treatment bag main body 10 gradually inflates. At this time, the filling water 300 in the water tank 2 corresponding to an amount of liquid increased by the supplied raw water 200 flows to the filling water storage tank 3 side from the overflow port 21 through the overflow tube 21A. The excess filling water 300 in the filling water storage tank 3 is supplied to, e.g., a non-illustrated treated water tank provided in the outside from the filling water discharge port 33.

At the time of supplying the raw water, when a some amount of the sludge 201 deposited in the previous treatment is left in the treatment bag main body 10, an input amount of the aggregating agent can be reduced, which is preferable because a running cost can be decreased.

This water treatment device T1 can constitute a treatment chamber for treating the raw water by just immersing the treatment bag 1 in the water tank 2. Therefore, a flexible sheet or the like does not have to be utilized to constitute a partition wall in the water tank 2 in order to form the treatment chamber. Therefore, a simple container can be employed as the water tank 2, and the inexpensive water treatment device having the simple structure can be configured.

Furthermore, dedicated power for maintaining the water level in the water tank 2 constant does not have to be provided, and hence the configuration can be simplified, thereby reducing a power cost.

Moreover, since the treatment bag main body 10 configured to carry out a treatment is immersed in the filling water 300 in the water tank 2, it does not have a portion which is secured to the inner wall of the water tank 2 and on which stress is concentrated at the time of inflation/deflation like a conventional partition wall formed of a flexible sheet, and the entire treatment bag main body 10 can irregularly and freely inflate/deflate at the time of inflation/deflation. Additionally, a water pressure of the filling water 300 is applied to the entire treatment bag main body 10, abrasion, wear, inflection, or flexure can be prevented from being concentrated on a specific region of the treatment bag main body 10, and hence durability of the treatment bag main body 10 can be improved to prolong life duration, thereby obtaining an effect with a high economic potential.

Figure 7:
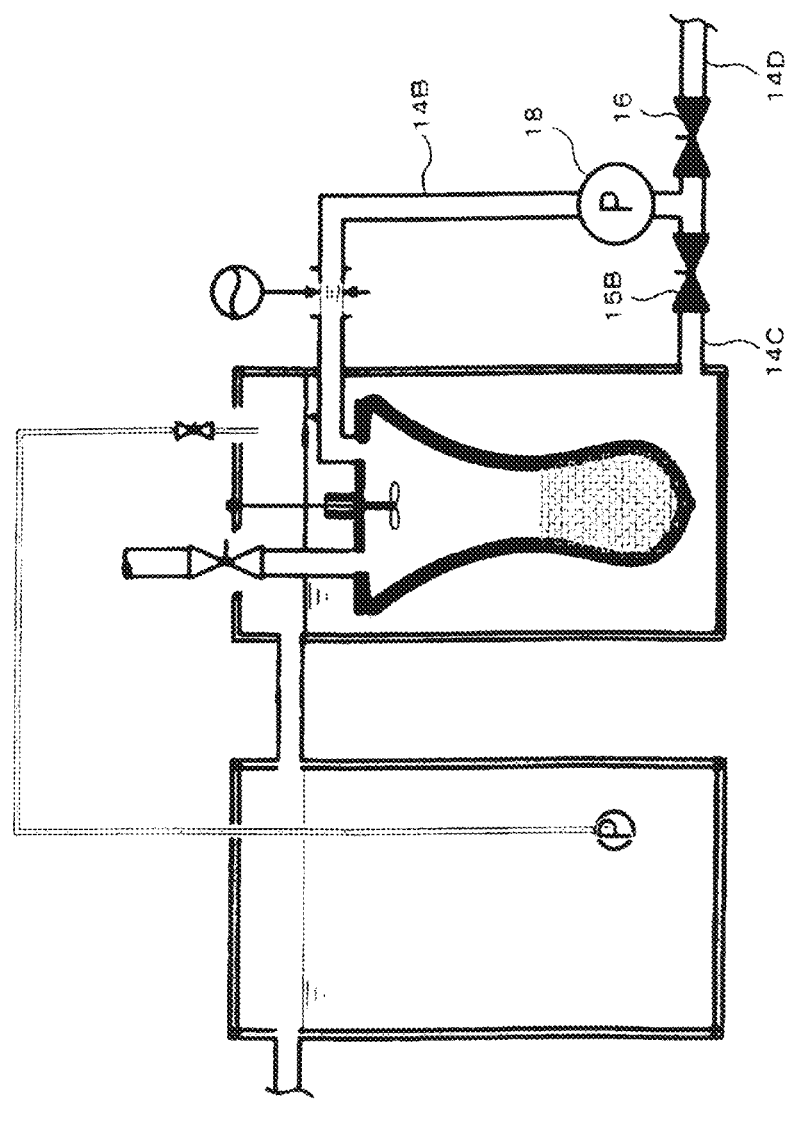
FIG. 7 is a schematic block diagram showing another mode of the water treatment device according to the first embodiment.

In this water treatment device T1, the treated water inlet tube 14C and the sludge discharge tube 14D branching from the discharge tube 14B may be provided at the end of the discharge tube 14B to form a T-like shape as shown in FIG. 7. The end of the discharge tube 14B is downwardly extended to a position near a bottom portion of the water tank 2, the treated water inlet tube 14C branches toward the water tank 2, and the sludge discharge tube 14D branches toward a direction different from the water tank 2.

In this conformation, it is preferable for the discharge pump 18 provided in the discharge tube 14 to be provided near a branching point below the discharge tube 14. Since a push-in pressure of the treated water 202 or the sludge 201 discharged from the discharge port 12B is applied to the discharge pump 18, the treated water 202 or the sludge 201 can be discharged from the treatment bag main body 10 by small drive force.

Figure 8:
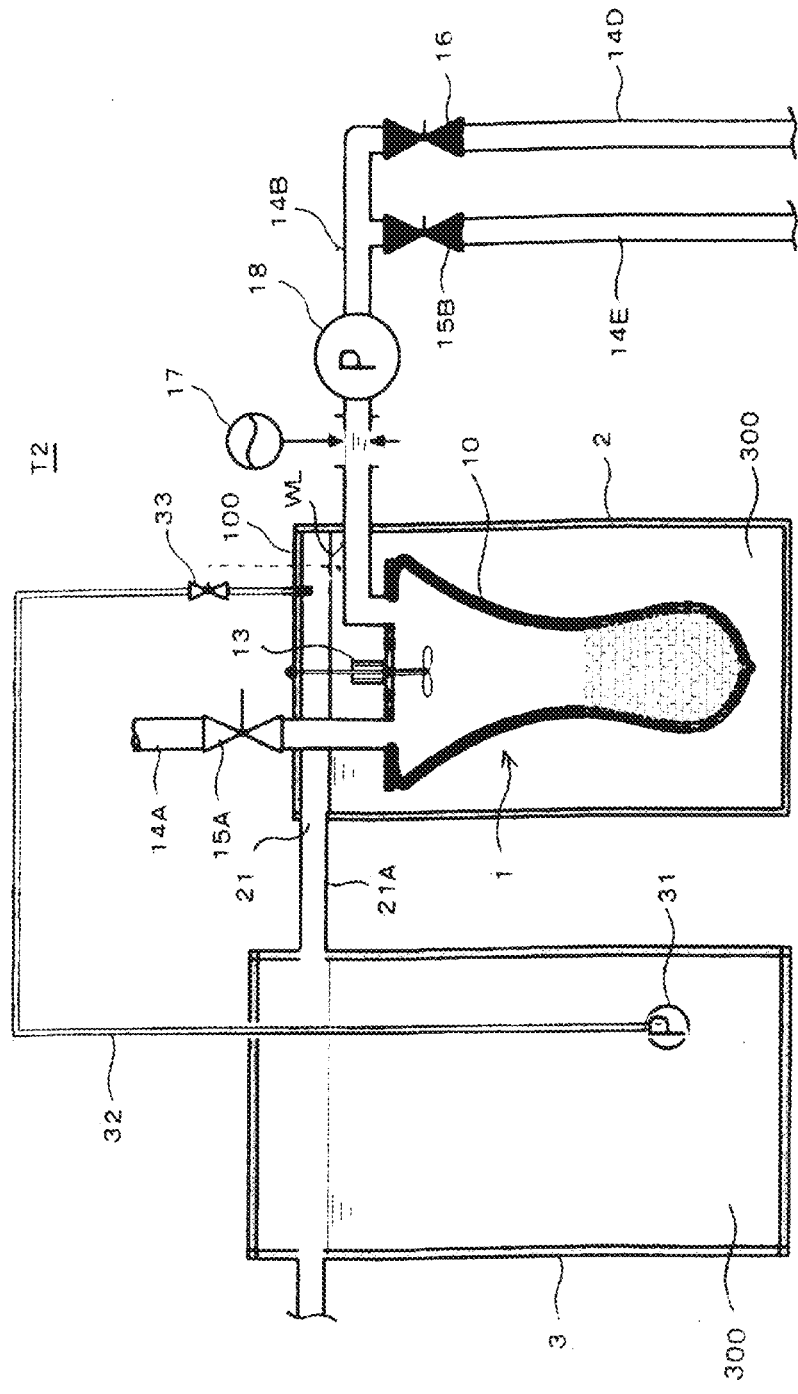
FIG. 8 is a schematic block diagram showing a second embodiment of a water treatment device.

FIG. 8 shows a second embodiment of a water treatment device. Like reference numerals equal to those in FIG. 1 and FIG. 2 denote like structures, and the above description of these items applies equally to this FIG. 8.

In this water treatment device T2, a treated water discharge tube 14E downwardly branches at an end of a discharge tube 14B like a sludge discharge tube 14D. Therefore, treated water 202 does not return into a water tank 2.

This water treatment device T2 has an advantage in that the treated water 202 and sludge 201 can be readily discharged by a siphon effect. Therefore, a discharge pump 18 is not required.

In this water treatment device T2, since the treated water 202 in the treatment bag main body 10 is not returned into the water tank 2, filling water 300 is supplied into the water tank 2 from a filling water storage tank 3 through a filling water supply tube 32 by driving of a supply pump 31 at the time of discharge of the treated water 202 in order to maintain a water level of the filling water 300 in the water tank 2 constant. A non-illustrated liquid level gauge detects a water amount of the filling water 300 in the water tank 2, and controlling means controls driving of the supply pump 31 and opening/closing of an opening/closing valve 33 provided in the filling water supply tube 32. Therefore, the water level of the filling water 300 in the water tank 2 is always maintained constant.

As the filling water 300 in this case, a liquid other than the treated water 202, e.g., tap water, marine water, river water, or lake water can be used.

It is to be noted that, in this water treatment device T2, the filling water 300 may be supplied into the water tank 2 from the filling water storage tank 3 based on natural falling at the time of supplying the filling water 300 into the water tank 2 by arranging the filling water storage tank 3 to be higher than the water tank 2. In this case, since the filling water 300 can be supplied into the water tank 2 from the filling water storage tank 3 by just controlling the opening/closing valve provided in the filling water supply tube between the filling water storage tank 3 and the water tank 2 to be opened/closed, a pump configured to supply the filling water into the water tank 2 does not have to be provided, thus reducing a power cost and a facility cost.

In regard to the filling water 300 that is insufficient in the filling water storage tank 3, a timing (during rest) for a treatment in the treatment bag 1 in the water tank 2 can be utilized to replenish, e.g., tap water. Since a water amount in this case can be a unit water amount smaller than a unit water amount of the discharge pump 18, a large pump does not have to be used. Therefore, a power cost can be reduced even though the pump is used.

In each of the above-described first and second water treatment devices T1 and T2, although the one water tank 2 is arranged with respect to the one filling water storage tank 3, the plurality of water tanks 2 may be arranged with respect to the one filling water storage tank 3 to carry out a treatment. In this case, it is preferable to stagger each timing of a treatment process in the treatment bag 1 in each water tank 2.

Figure 9:
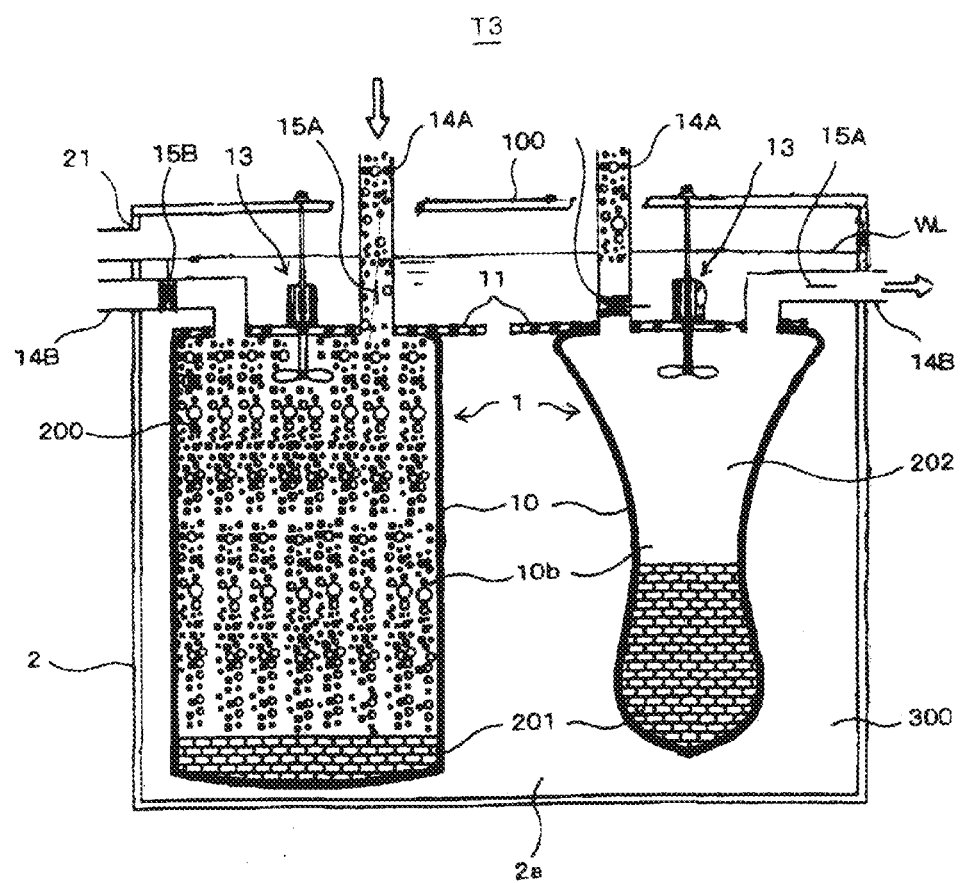
FIG. 9 is a schematic block diagram showing a third embodiment of a water treatment device.

FIG. 9 shows a third embodiment of a water treatment device. Like reference numerals equal to those in FIG. 1 and FIG. 2 denote like structures, and the above description of these items applies equally to this FIG. 9.

In this water treatment device T3, two treatment bags 1 are suspended and immersed in one water tank 2 storing filling water 300 in such a manner that a supply portion 11 is placed to be lower than a water level WL. Here, the inside of the water tank 2 is likewise partitioned into interior spaces 10b of respective treatment bag main bodies 10 and an exterior space 2a in which the filling water 300 is stored.

When carrying out a treatment for raw water by using this water treatment device T3, it is preferable to stagger each timing for a treatment process in each treatment bag 1. That is, it is preferable to stagger each timing for the treatment process in such a manner that the treatment bag 1 on the right-hand side in the drawing discharges the treated water in the treatment bag main body 10 at the timing that the treatment bag 1 on the left-hand side in the drawing supplies raw water 200 into the treatment bag main body 10, for example. As a result, a water amount of the filling water 300 in the water tank 2 does not greatly fluctuate, and a self-weight balance of the water tank 2 itself does not largely change.

The treated water in each treatment bag main body 10 is discharged to the outside from a side surface of the water tank 2 lower than the water level WL through a discharge tube 14B, and it is supplied to, e.g., a non-illustrated treated water storage tank. Additionally, the treated water may be returned into the exterior space 2a of the water tank 2 through a treated water inlet tube 14C depicted in FIG. 1.

When supplying the treated water into an external tank such as a treated water storage tank, it is preferable to arrange a supply destination tank to be lower than the water level WL of the filling water 300 in the water tank 2. That is, in case of supplying the raw water 200 into the treatment bag main body 10 of one treatment bag 1, when an opening/closing valve 15B of the other treatment bag 1 is opened to open a flow path of the discharge tube 14B in advance and the highest point of the discharge tube 14B is arranged to be lower than the water level WL of the water tank 2, the treated water 202 in the treatment bag main body 10 can be naturally flowed to the outside of the water tank 2 through the discharge tube 14B by the siphon effect without requiring pump power for discharge.

In this water treatment device T3, although the two treatment bags 1 are immersed in one water tank 2, the three or more treatment bags 1 may be immersed. In this case, it is needless to say that staggering the timing for the treatment process in each treatment bag 1 is preferable.

Figure 10:
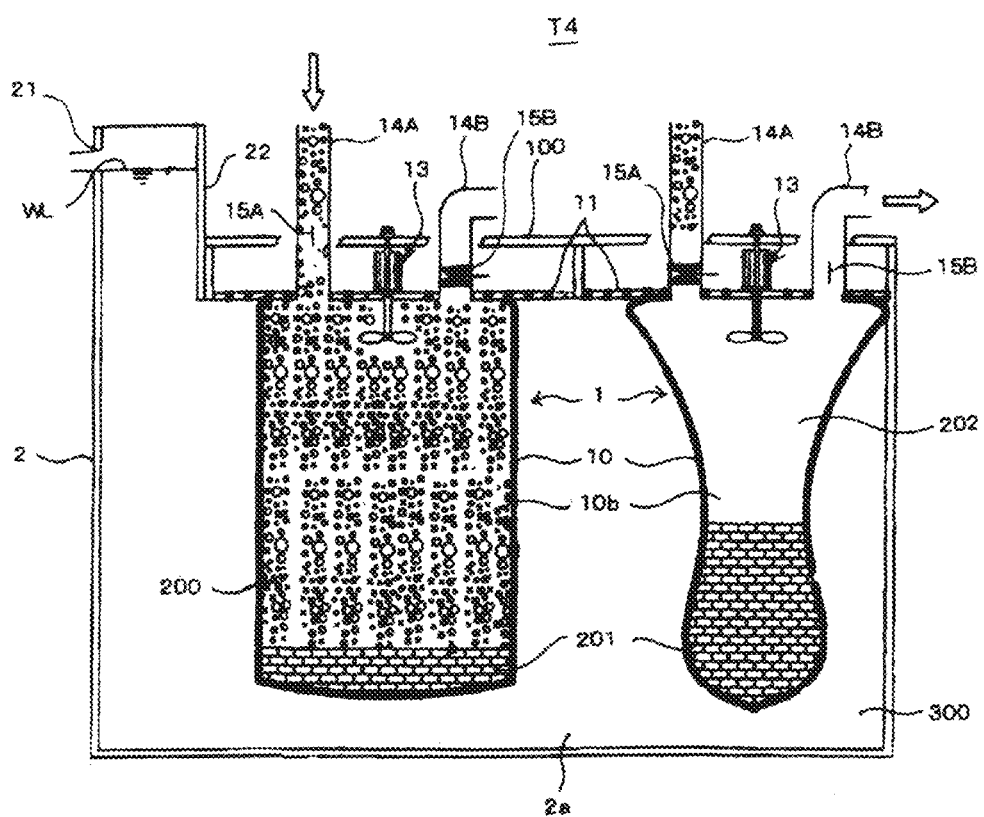
FIG. 10 is a schematic block diagram showing a fourth embodiment of a water treatment device.

FIG. 10 shows a fourth embodiment of a water treatment device. Like reference numerals equal to those in FIG. 1 and FIG. 2 denote like structures, and the above description of these items applies equally to this FIG. 10.

In this water treatment device T4, like the water treatment device T3 depicted in FIG. 9, although two treatment bags 1 are suspended and immersed in one water tank 2 in which filling water 300 is stored, an upper portion of the water tank 2 is closed by supply portions 11 of the respective treatment bags 1 and rises from a lateral side of an installing region for the respective treatment bags 1 to be higher than the respective supply portions 11, thereby forming a raised wall portion 22 whose upper surface is opened. A water level WL of the filling water 300 and an overflow port 21 are placed at a position of the raised wall portion 22 that is higher than the respective supply portions 11.

Further, a discharge tube 14B of each treatment bag 1 rises from the supply portion 11 and laterally bends at a position lower than the water level WL of the filling water 300 to be coupled with, e.g., a non-illustrated treated water storage tank. Furthermore, like FIG. 1, the discharge tube 14B may be returned to an exterior space 2a in the water tank 2 by using a treated water inlet tube 14C.

According to this water treatment device T4, the three or more treatment bags 1 may be used, raw water 200 can be treated to take out treated water 202 like the water treatment device T3, the same effects as those of the water treatment device T3 can be exercised, and the upper surface of the supply portion 11 of each treatment bag 1 is arranged to be exposed on the water, thereby obtaining an advantage that maintenance of an agitator 13, respective opening/closing valves 15A and 15B, and others can be facilitated.

Figure 11:
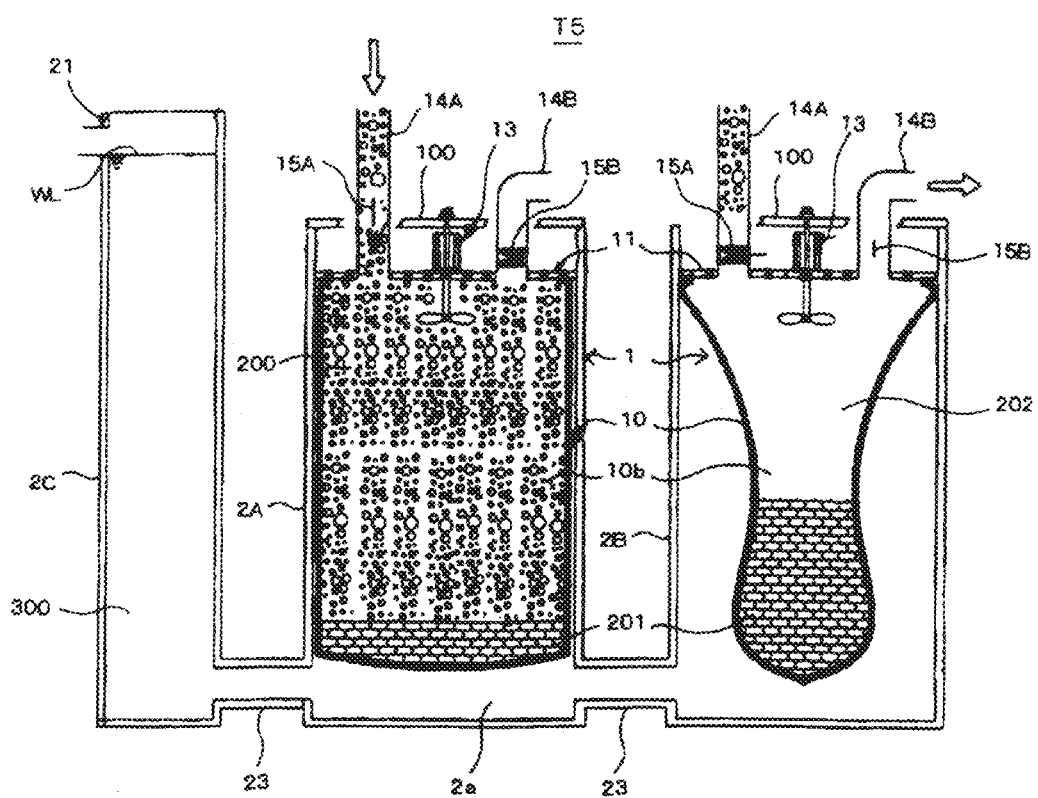
FIG. 11 is a schematic block diagram showing a fifth embodiment of a water treatment device.

FIG. 11 shows a fifth embodiment of a water treatment device. Like reference numerals equal to those in FIG. 1 and FIG. 2 denote like structures, and the above description of these items applies equally to this FIG. 11.

This water treatment device T5 is of a configuration that the water tank 2 in the water treatment device T4 depicted in FIG. 10 is substituted by water tanks 2A and 2B independent for respective treatment bags 1, the raised wall portion 22 in the water treatment device T4 is substituted by an independent water tank 2C, coupling these water tanks by using a coupling tube 23 to connect the insides of the respective water tanks 2A to 2C with each other, and filling water 300 is stored in the respective water tanks.

Upper surfaces of the water tanks 2A and 2B having the treatment bags 1 provided therein are closed by supply portions 11, and a water level WL of the filling water 300 and an overflow port 21 are placed to be higher than the respective supply portions 11 in the water tank 2C like the water treatment device T4.

Further, a discharge tube 14B of each treatment bag 1 rises from the supply portion 11 and laterally bends at a position lower than the water level WL of the filling water 300 to be coupled with, e.g., a non-illustrated treated water storage tank. Furthermore, like FIG. 1, supply to an exterior space 2a in the water tank 2 may be achieved through a treated water inflow tube 14C.

According to this water treatment device T5, likewise, the three or more water tanks each having the treatment bag 1 installed therein may be prepared and coupled with each other through the coupling tube 23, and the same effects as those of the water treatment device T4 can be obtained.

Figure 2:
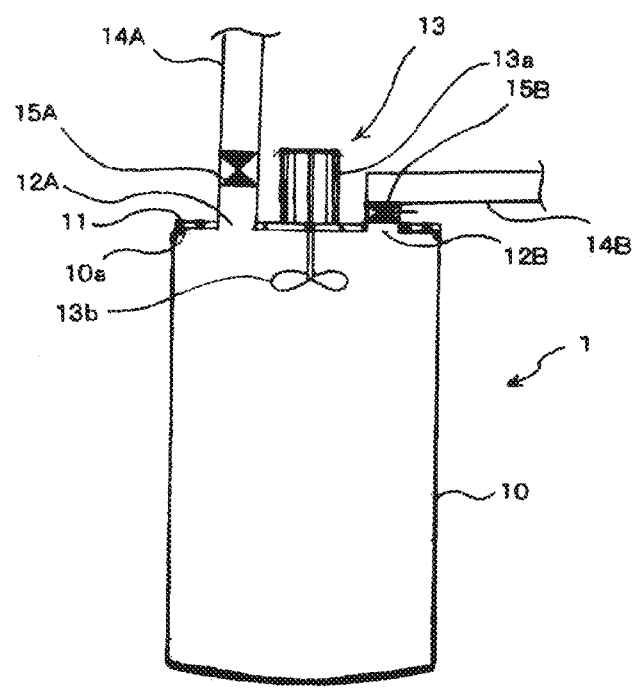
FIG. 2 is a schematic block diagram showing a treatment bag.

Although the treatment bag 1 depicted in FIG. 2 is used in the above-described water treatment devices T1 to T5, any treatment bag can be adopted as long as it is impermeable and flexible and can be formed into a sealed shape except a supply port and a discharge port, and it is not restricted to the treatment bag 1 shown in FIG. 2. For example, the agitator 13 may be provided to the column support 100 of the water tank 2 in place of the treatment bag main body 10. In this case, the supply portion 11 is not required.

Moreover, as described above, the treatment device according to the present invention is not restricted to the water treatment device that performs an aggregation and agitation treatment with respect to water to separate treated water from sludge, and it can be extensively applied to applications for treating various kinds of treatment target liquids by using the treatment bag immersed in the filling water 300 in the water tank 2 and discharging the treated liquid after the treatment.

In the treatment device according to the present invention, since the entire treatment bag is immersed in the filling water 300 in the water tank 2, the inside of the treatment bag can be heated, cooled, or kept warm by heating or cooling the filling water 300 to an appropriate temperature. For example, when performing a reaction treatment in the treatment bag, the reaction treatment can be carried out in an optimum temperature atmosphere by heating or cooling the filling water 300 in the exterior space 2a of the water tank 2 to a temperature required for the reaction.

Since the filling water 300 in the water tank 2 covers the entire treatment bag, a heating, cooling, or heat retaining treatment can be efficiently conducted under optimum conditions without being dependent on an ambient temperature outside the water tank 2. In this case, heating or cooling means for heating or cooling the filling water 300 is of course provided in the filling water storage tank 3 or at any other appropriate position. Moreover, it is also preferable to enable maintaining the inside of the treatment bag in the water tank 2 at a fixed temperature for a long time by providing circulating means for circulating the filling water 300 between the inside of the water tank 2 and the inside of the filling water storage tank 3.

In regard to the treatment bag according to the present invention, the treatment bag 1 depicted in FIG. 2 can be solely used. For example, the treatment bag can be immersed in the filling water stored in, e.g., a concrete water tank, a pool, or a container and it can be suspended from a column support or the like installed above the water in such a manner that the supply portion 11 having the agitator 13 disposed thereto can be placed to be lower than the water level. The column support may be floated and installed on the water surface by using, e.g., a non-illustrated bladder, or it may be fixed to a floating construction or the land to be installed on the water surface.

Additionally, as the treatment bag according to the present invention, any treatment bag that is immersed in the filling water whose water level is constantly maintained can suffice, and it does not have to have the agitator 13 and the supply portion 11 of the treatment bag 1 depicted in FIG. 2.

Besides using power of the pump to discharge the liquid in the treatment bag, the liquid in the treatment bag can be also discharged by using force in deflation of the treatment bag main body 10 when the flexibility of the treatment bag main body 10 is utilized to exert compression force from the outside to the treatment bag main body 10 through appropriate means.

The invention claimed is:

1. A treatment device, comprising:
   a treatment bag including
   a treatment bag main body formed of an impermeable flexible sheet;
   a supply port through which a treatment target liquid is supplied into the treatment bag main body; and
   a discharge port through which a treated liquid is discharged to the outside;
   a water tank having filling water stored therein, wherein immersion of the treatment bag into the inside of the water tank partitions the inside of the water tank into an interior space of the treatment bag main body and an exterior space in which the filling water is stored; and
   an overflow port provided on the water tank that discharges to an outside of the water tank;
   wherein the filling water volume inside the water tank corresponds to an amount of liquid increased when the treatment target liquid is supplied into the treatment bag main body from the supply port, and is provided with a treated water inlet tube through which the treated liquid discharged from the discharge port of the treatment bag flows into the exterior space in the water tank;
   wherein the treatment bag does not have any portion secured to an inner wall of the water tank.

2. The treatment device according to claim 1, further comprising a filling water storage tank wherein an inside of the filling water storage tank is connected to the overflow port of the water tank through an overflow tube.

3. The treatment device according to claim 1, further comprising:
   a discharge tube that is connected to the discharge port wherein an end of the discharge tube is branched to a treated water inlet tube and a sludge discharge tube;
   a first opening/closing valve that is provided to open/close a flow path at the treated water inlet tube;
   a second opening/closing valve that is provided to open/close a flow path at the sludge discharge tube;
   a turbidity sensor at the discharge tube, and
   a controlling means is provided to control the opening of the opening/closing valve of the treated water inlet tube and the opening of the opening/closing valve of the sludge discharge tube to discharge sludge from the sludge discharge tube if the turbidity sensor detects change of turbidity due to sludge mixed into the treatment liquid flowing through the discharge tube when the treated liquid in the treatment bag main body is discharged from the discharge port to the treated water inlet tube.

* * * * *